(12) United States Patent
Todd et al.

(10) Patent No.: US 7,796,516 B2
(45) Date of Patent: Sep. 14, 2010

(54) ADAPTIVE VOICE PACKETIZATION

(75) Inventors: Terence Douglas Todd, Hamilton (CA); Ahmad Mohammad Mohammad Kholaif, Hamilton (CA)

(73) Assignee: McMaster University, Hamilton, Ontario (CA)

( * ) Notice: Subject to any disclaimer, the term of this patent is extended or adjusted under 35 U.S.C. 154(b) by 516 days.

(21) Appl. No.: 11/680,104

(22) Filed: Feb. 28, 2007

(65) Prior Publication Data
US 2007/0211767 A1   Sep. 13, 2007

Related U.S. Application Data

(60) Provisional application No. 60/780,058, filed on Mar. 8, 2006.

(51) Int. Cl.
*H04L 12/66* (2006.01)
(52) U.S. Cl. .................. 370/232; 370/338; 370/352
(58) Field of Classification Search .......... 370/232, 370/470, 471, 465, 466, 467, 252, 338, 352, 370/389, 392, 229, 474, 476, 401
See application file for complete search history.

(56) References Cited

U.S. PATENT DOCUMENTS

| | | | |
|---|---|---|---|
| 7,167,451 B1* | 1/2007 | Oran | 370/252 |
| 2002/0181494 A1 | 12/2002 | Rhee | |
| 2002/0186660 A1* | 12/2002 | Bahadiroglu | 370/248 |
| 2005/0063390 A1 | 3/2005 | Nealon | |
| 2005/0226219 A1* | 10/2005 | Casey et al. | 370/352 |
| 2006/0007914 A1 | 1/2006 | Chandra et al. | |
| 2006/0160508 A1* | 7/2006 | Narayanaswami et al. | 455/151.2 |
| 2007/0165610 A1* | 7/2007 | Tseng et al. | 370/356 |
| 2008/0012736 A1* | 1/2008 | Goossens et al. | 341/51 |

FOREIGN PATENT DOCUMENTS

EP    0712250    6/2005

OTHER PUBLICATIONS

Trad, Abdelbasset et al., "Adaptive VoIP Transmission over Heterogeneous Wired/Wireless Networks", Interactive Multimedia and Next Generation Networks; Second International Workshop on Multimedia Interactive Protocols and Systems, MIPS 2004, Nov. 16-19, 2004 Proceedings, pp. 25-36., (November 2004).

Hoene, Christian et al., "A Perceptual Quality Model for Adaptive VoIP Applications", Proceedings of International Symposium on Performance Evaluation of Computer and Telecommunication Systems (SPECTS'04), San Jose, California, USA, Jul. 2004, 11 pages., (Jul. 2004).

(Continued)

*Primary Examiner*—Brian D Nguyen
(74) *Attorney, Agent, or Firm*—Integral Intellectual Property Inc.; Miriam Paton

(57) ABSTRACT

A method is presented for adapting the packet size for VoIP communications, determined on-the-fly by the total network delay inherent at the time of packet transmission. If network delays are small relative to the maximum permissible latency for VoIP communications, the payload size per packet may be increased to maximize efficiency for the transmitted call. Alternatively, if network delays are large, the payload size per packet may be decreased in order to assure that the perceived quality of the transmitted call is acceptable.

12 Claims, 4 Drawing Sheets

OTHER PUBLICATIONS

Handley, M. et al., "RFC3448: TCP Friendly Rate Control (TFRC) Protocol Specification", Jan. 2003, pp. 1-24. Http://www.ietf.org/rfc/rfc3448.txt, Internet address valid as of May 3, 2007,(Jan. 2003).

Smith, Arthur, Written Opinion of the International Searching Authority for PCT/CA2007/000327, May 22, 2007.

Kesting, Christiane, Extended European Search Report for EP 07710666.4, Jun. 29, 2009.

Korean Intellectual Property Office, First Office Action for KR 10-2008-7023297, Apr. 27, 2010.

Kesting, Christiane, Third Exam Report for EP 07710666.4, Mar. 15, 2010.

\* cited by examiner

ADAPTIVE VOICE PACKETIZATION

CROSS-REFERENCE TO RELATED APPLICATIONS

This application claims priority under 35 USC 119(e) from U.S. Provisional Patent Application No. 60/780,058, filed Mar. 8, 2006, and which is incorporated by reference herein.

BACKGROUND

In recent years, the IEEE 802.11 standard for Wireless Local Area Networks (WLANs) has emerged as a prevailing technology for "last mile" broadband wireless access networks. While the principal application of these networks has been in providing connectivity to devices running best effort data applications, such as email and web browsing, interest is growing in supporting isochronous services such as telephony service or streaming video. Voice over Internet Protocol (VoIP) over WLAN (VoWLAN) is currently one of the fastest growing Internet applications.

In VoIP, the voice signal is sampled at a fixed rate. A "packet" is assembled from the data, including multiple headers, a payload and one or more trailers. The headers and trailers include: (i) information about the packet origin and destination; (ii) information about the packet's relative position in the stream of packets that comprise the call; (iii) information about the communications protocols being used by the network; and (iv) error-checking information, among other things. Taken together, the headers and trailers are referred to as the overhead associated with a packet. The payload is the portion of the packet that contains the voice samples corresponding to the digitized voice signal. The time between generation of two consecutive packets is known as the packetization interval. Typically, the packets are of a constant length, and the packetization interval is determined by the type of Vocoder being used to transmit the call. Typical vocoders use 10-30 ms packetization intervals. For example, G.711 type vocoders often use a 20 ms packetization interval.

For short packetization intervals, the fraction of a packet corresponding to overhead can be large, due mainly to the number of bytes required to characterize the various protocol layers. The transmission efficiency of the call is largely determined by the fraction of the packet that corresponds to the actual payload. Larger packets with a larger payload increase the efficiency of the communication, but under certain circumstances may result in poor quality of the phone call due to increased packetization latency.

In many cases, the devices used for VoIP calls are portable handheld devices that are powered by batteries. Short packetization intervals result in faster depletion of the stored energy in a battery-powered mobile communications device, because the percentage of time that the device is involved in transmitting/receiving of voice packets is higher for the same amount of data due to the overhead in each short packet. Longer packetization intervals are also desirable in this context to decrease power usage and conserve batteries.

SUMMARY

A method is presented for adapting the packet size for VoIP communications, determined on-the-fly by the network latency at the time of connection establishment or packet transmission. If network delays are small relative to the maximum permissible latency for VoIP communications, the payload size per packet may be increased, i.e. a longer packetization interval may be used, to maximize efficiency for the transmitted call. Alternatively, if network delays are large, a shorter packetization interval may be used in order to assure that the perceived quality of the transmitted call is acceptable. A single VoIP call may be broken into two or more concatenated legs, wherein each leg may use a different packetization interval. In addition to measuring or estimating the latency of the VoIP call to determine the packetization interval, overall network performance measures may also be considered. Packetization intervals may be adjusted to maximize the total number of VoIP calls that may be accommodated by the network at one time, or to reduce loading at certain network access points that are experiencing particularly heavy traffic.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

Figure 1:
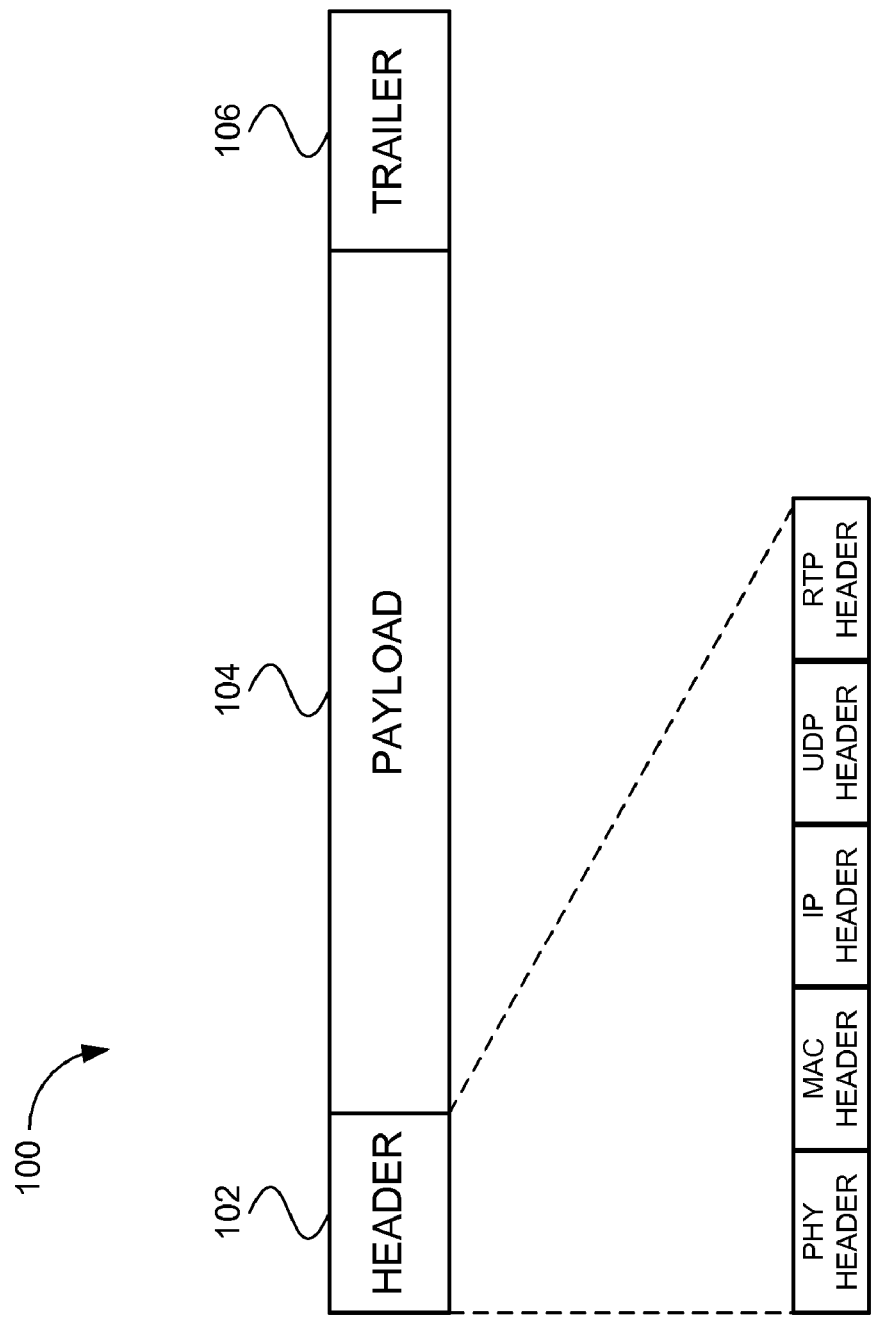
FIG. 1 is a schematic of an exemplary packet structure.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

To increase the transmission efficiency of a VoIP call, a longer packet may be used to increase the payload relative to the overhead. However, under certain circumstances, longer packets can have a negative effect on the perceived quality of the call. Because more voice data is contained in each packet, the loss of a single packet during transmission has a more serious impact on the perceived quality of the call than the loss of shorter packets. While Packet Loss Concealment (PLC) techniques may be used to mask the effect of lost packets, current PLC techniques are inadequate for concealing a loss of more than 20 ms of samples for a type G.711 vocoder. 30-40 ms of samples may be concealed for G.729 and G.723 vocoders. Longer packetization intervals (resulting from longer packets) also contribute to increased latency, or transmission delay, for the call. A maximum latency target specified by International Telecommunication Union Standardization Sector (ITU-T) standard G.114 is often used; this states that a maximum one-way (mouth-to-ear) delay of 150 ms provides satisfactory quality for telephony applications. To limit the one-way latency to 150 ms, all internal network delays must be accounted for and controlled: including, for example, propagation and queuing delay through the network, scheduling delay because of congestion, and access link serialization delay. The packetization interval also contributes to latency, in that the minimum one-way delay for a 100 ms packetization interval is 100 ms.

The latency for a single communicated call on a given network is highly variable and specific to that particular call. It depends on factors such as the amount of network traffic at that time, or the "location" of the originating device relative to the destination device, i.e. the number and type of intermediate devices that are required to connect the two devices. Currently, however, a standard packetization interval is typically used, corresponding to the vocoder used. Table I lists the typical packetization intervals used for common vocoder types. These vocoders are all constant-bit-rate (CBR) devices. Most commercially available WLAN mobile stations generate audio frames at a constant rate; however, several commercially available mobile stations support different sets of vocoders at different voice coding rates and with varying packetization intervals. New mobile stations may allow a more flexible determination of packetization intervals, for example, at multiples of 10 ms up to some maximum value.

TABLE 1

Example attributes of commonly used codecs

| Codec | G.711 | G.723.1 | G.726-32 | G.729 |
|---|---|---|---|---|
| Bit rate (Kbps) | 64 | 5.3 or 6.3 | 32 | 8 |
| Framing interval (ms) | 20 | 30 | 20 | 10 |
| Payload (Bytes) | 160 | 20 or 24 | 80 | 10 |
| Packets/sec | 50 | 33 | 50 | 50 (2 frames/packet) |
| Packetization Interval (ms) | 20 | 30 | 20 | 20 |

The maximum packetization interval that may be used, subject to end-to-end latency constraints, may be highly specific for a particular call, according to the network useage at that time and the location of the origin and destination devices within the network. For example, at the time of the call, some of the access points (AP) in the network may be experiencing particularly heavy traffic. If the call requires routing through one of these APs, increased latency may be expected. By dynamically maximizing the packetization interval as a function of the actual end-to-end latency at the time of the actual call, the transmission efficiency for each call may be increased, and the overall efficiency of the WLAN network for supporting VoIP traffic may be maximized. In addition, using longer packetization intervals may result in reduced power consumption for battery-powered mobile stations.

FIG. 1 is a schematic diagram of an exemplary packet structure for a VoWLAN call. Each packet 100 is comprised of the following component segments: (i) a header 102 comprised of a Physical layer header (PHY header), a Medium access control header (MAC header), and 40-Bytes of headers at other layers (e.g. Internet Protocol (IP), User Datagram Protocol (UDP), and Real-Time Transport Protocol (RTP)); (ii) a relatively small payload of 10-30 Bytes worth of data 104; and (iii) a trailer 106 comprised of cyclic redundancy check (CRC) values used to ensure the integrity of the received packet.

Figure 2:
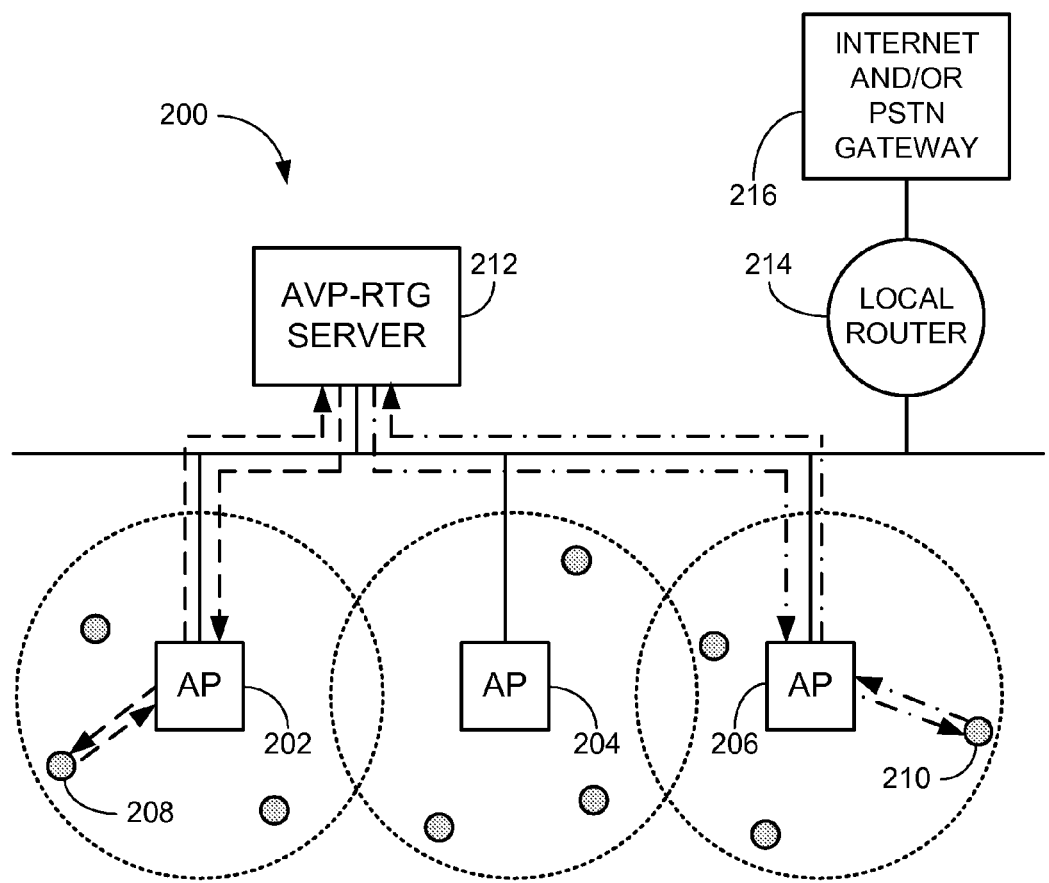
FIG. 2 is a schematic of an exemplary WLAN system that is compatible with an Adaptive Voice Packetization (AVP) scheme.

FIG. 2 shows an exemplary WLAN system, 200, capable of supporting an Adaptive Voice Packetization (AVP) scheme. A set of APs 202, 204 and 206, provide wireless coverage for a population of Mobile Stations (MS), including 208 and 210. Although the LAN is depicted as a shared medium, in practice it more commonly comprises a set of interconnected layer 2 switches. An AVP-enabled real-time gateway (AVP-RTG) server 212 is placed on the switched network that services the APs. A local router 214 controls communication with the Internet and/or a Public Standard Telephone Network (PSTN) through a gateway 216.

Examples of devices for mobile stations 208, 210, are IP phones, cellular telephones, smart phones, personal digital assistants (PDAs), wireless handheld computers, wireless notebook computers, wireless laptop computers, wireless desktop personal computers and the like.

The server can be any conventional voice gateway or RTP proxy that features the AVP scheme. The term "server" is intended to encompass a device functionally resembling a computer (e.g., having computation ability, memory, and/or connectivity capability). A typical server according to the definition as used in the present application may include, but is not limited to, any computer (e.g., mainframe, corporate server, personal computer, laptop, PDA, and the like). In various other embodiments of the present invention, the term "server" is intended to encompass a device not typically considered a computer but having similar capabilities.

Figure 3:
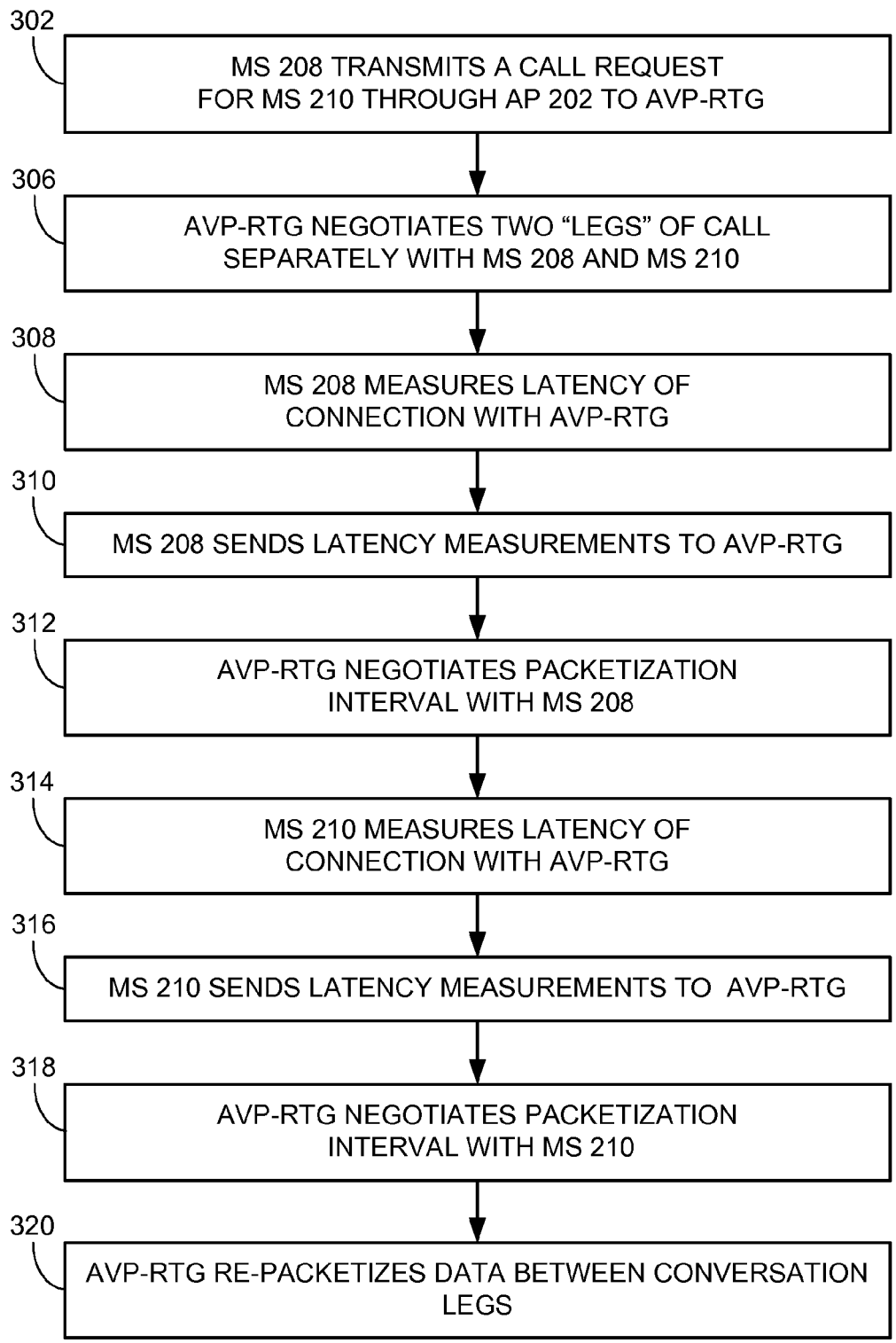
FIG. 3 is a flowchart of an exemplary method for AVP, compatible with the WLAN system shown in FIG. 2.

FIG. 3 shows an exemplary method for AVP that is compatible with IEEE 802.11 legacy mobile stations, and may be supported by a network such as is shown in FIG. 2. In this method, all intra-enterprise voice traffic through the APs is routed through the AVP-RTG server 212 before passing on to the destination APs, including traffic that passes through a single AP, i.e., when both call parties are in the coverage region of the same AP. Packet flow in the outbound direction from the LAN remains unchanged and is sent directly towards the local router 214. During connection setup and SDP (Session Description Protocol) message exchange, the AVP-RTG server 212 negotiates the maximum possible voice packetization intervals with both mobile stations subject to codec type and round-trip latency constraints. For internal traffic, the packet loss rate is typically very low, so that the infrequent loss of longer packets has minimal effect on call quality.

At 302, MS 208 initiates a call to MS 210 by transmitting a call request through AP 202 to AVP-RTG server 212. This call request could be sent directly from MS 208 to AVP-RTG server 212 or it may be forwarded via other means such as a SIP proxy server. At 306, AVP-RTG server 212 negotiates a VoIP connection with both MS 208 and MS 210, such that two "legs" constitute a single VoIP call, with each leg having one of the mobile stations (i.e., 208 or 210) and AVP-RTG server 212 as its terminating points. At 308, MS 208 measures the round-trip latency of the connection with AVP-RTG server 212. An IP-based mobile station can easily measure the delay and jitter of an RTP connection using, for example, the SR and RR (Sender Report and Receiver Report) packets of the Real Time Control Protocol (RTCP). At 310, MS 208 sends latency measurements to AVP-RTG server 212, for example, statistics of the round-trip delay such as the mean and variance. AVP-RTG server 212 uses the measured latency information to determine the available "latency margin" for the leg, i.e. the difference between the actual latency and the maximum allowable latency. At 312, AVP-RTG server 212 negotiates, through Session Initiation Protocol and Session Description Protocol (SIP/SDP) signaling, a packetization interval for the leg by determining the maximum packetization interval supported by MS 208, subject to maximum latency constraints for that leg. At 314-318, a second, separate packetization interval for the second leg of the communication is determined. At 320, AVP-RTG server 212 acts as a translator by repackaging all incoming data from one leg into packets of the appropriate length for the other leg before transmitting them to AP 206, and vice versa. This action is transparent to MS 208 and MS 210. Having AVP-RTG server 212 break each end-to-end voice connection into two separate legs allows for negotiating asymmetric packetization intervals for the two legs of the same voice call. This may be useful, for example, because different IP-based mobile stations have different sets of voice codecs with different supported values for packetization intervals and playout buffers.

In this exemplary method, the latency is actually measured by the mobile station, however, other methods for measuring the latency may be substituted. For example the latency of the connection may be measured by an additional, separate device that is in series with the connection, or by the AVP-RTG server itself. Alternatively, the latency may be estimated or modeled based on knowledge of the relative locations of the pair of communicating devices and the network characteristics.

Computer-executable instructions for implementing an adaptive voice packetization scheme such as the above-described method may be stored on a form of computer readable media. Computer readable media includes volatile and non-volatile, removable and non-removable media implemented in any method or technology for storage of information such as computer readable instructions, data structures, program modules or other data. Computer readable media includes, but is not limited to, random access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium which can be used to store the desired instructions and which can be accessed by AVP-RTG 212, including by internet or other computer network forms of access.

Figure 4:
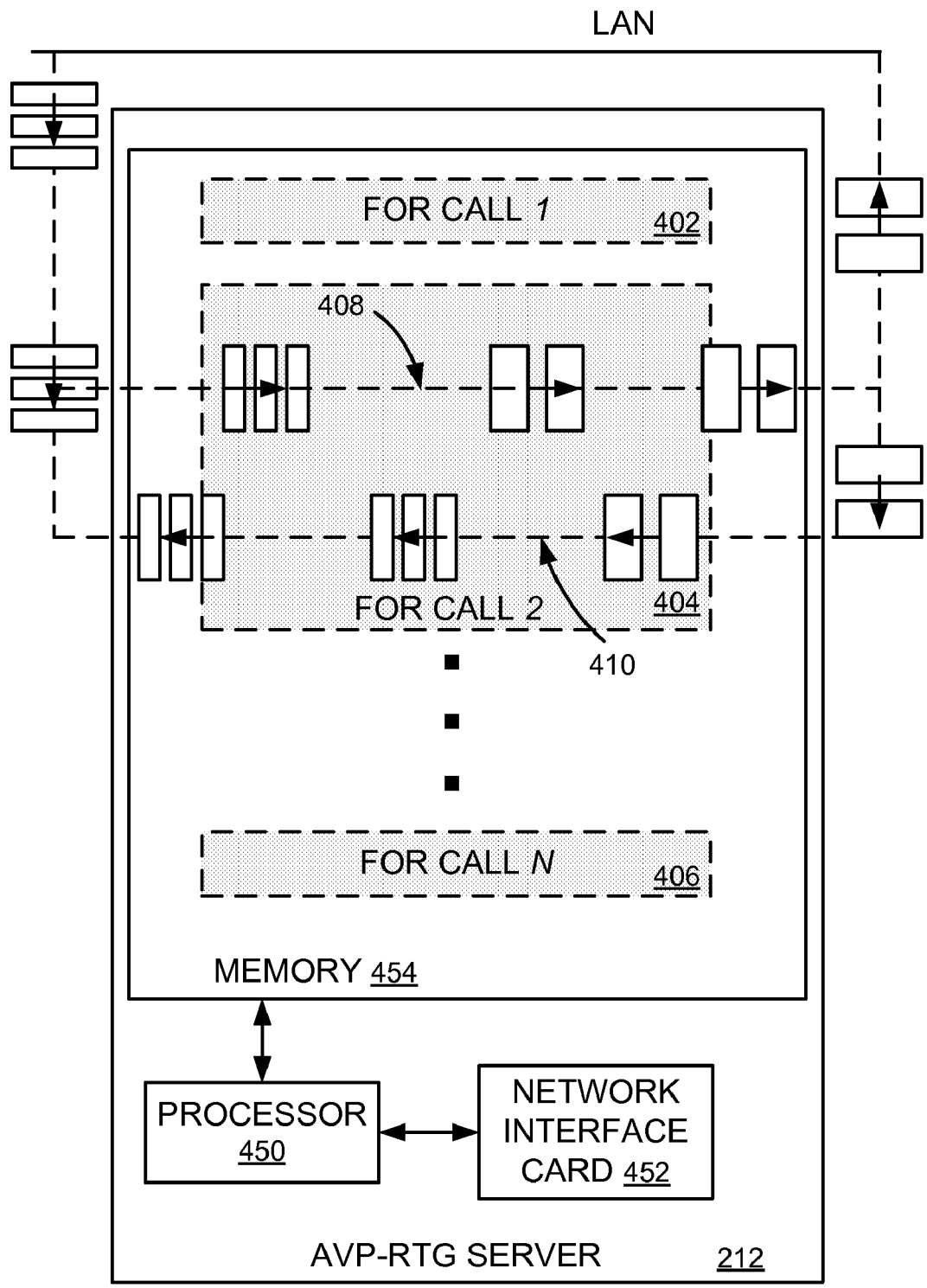
FIG. 4 is a schematic of an exemplary AVP server, compatible with the method shown in FIG. 3.

FIG. 4 shows an exemplary internal configuration for an AVP-RTG server. As with any network server, AVP-RTG server 212 comprises a processor 450, a network interface card (NIC) 452 coupled to processor 450, and a memory 454 coupled to processor 450. The device maintains a separate pair of queues for each VoIP session in the WLAN enterprise. The queues are created and maintained by code (not shown) stored in memory 454, which is executed by processor 450. In FIG. 4, it has been assumed that N active VoIP calls are being controlled by AVP-RTG server, with pairs 402, 404 and 406 of queues for calls 1, 2 and N, respectively. Code (not shown) stored in memory 454 is able, when executed by processor 450, to establish the legs of the active VoIP calls between the participants and AVP-RTG server 212. Within each pair, a single first-in-first-out (FIFO) queue may be used for voice packets arriving from each MS participating in the VoIP session. To conform to the negotiated packetization interval for each leg of the call, queued packets may be either split into shorter packets (as in queue 410) or aggregated into larger ones (as in queue 408) before they are passed on to the destination mobile station.

In the exemplary method outlined above and in FIGS. 2 to 4, packetization intervals are determined according to the measured latency margin of the two legs of the call only. The determination of the packetization intervals is accomplished by code (not shown) stored in memory 454, when executed by processor 450. An AVP scheme may also be used at the network management level, for example, to relieve network congestion or to reduce loading at certain APs that are experiencing particularly heavy traffic. In such a scheme, packetization intervals may be determined by consideration of the current utilization and/or loading of different APs in the network in addition to the latency for the call.

In one embodiment, a mobile station that is associated with a highly loaded (i.e. congested) access point may be favored by such an AVP algorithm by being assigned a larger packetization interval than the other mobile station that is associated with a relatively lightly loaded AP. As the volume of VoIP traffic across the WLAN changes with time, the AVP scheme may work to ensure equalization of load and utilization among different APs in the network. Such an algorithm has particular application for a WLAN with a highly variable, floating end user population, for example, at airports, hotels or coffee shops. Such an algorithm may also be extended to a multi-hop mesh network, resulting in significant improvements in the backhaul relaying capacity. By using an AVP scheme, the resulting capacity improvements are also strongly associated with improved power conservation for both IP-based mobile stations and APs.

An AVP algorithm for assigning packetization intervals may be formulated to maximize the number of VoIP sessions that may be accommodated by the network at one time, before new calls are blocked.

Maximizing Network Capacity:

In formulating such an algorithm, one may, for example, seek to maximize the number of VoIP sessions that may be accommodated at all the APs in the network before the first new call is blocked because of insufficient available resources. An example of such an analysis follows:

Let $N_i$ be the maximum number of VoIP sessions that can be supported simultaneously by a single IEEE 802.11 AP, $AP_i$. The transmission times for a downlink (DL) and an uplink (UL) packets are denoted $T_{DL}$ and $T_{UL}$, respectively.

For a VoIP packet, the header overhead $OH_{hdr}$ consists of the headers of RTP, UDP, IP, and IEEE 802.11 MAC layer:

$$OH_{hdr} = H_{RTP} + H_{UDP} + H_{IP} + H_{MAC} \text{(Bits)} \quad (1)$$

It is assumed that when an AP sends a DL VoIP packet, the MS acknowledges the reception of this packet before it sends an UL VoIP packet which should also be acknowledged by the AP. The overhead incurred at the MAC layer of the AP is thus:

$$OH_{AP} = PHY + SIFS + ACK \text{ (Second)} \quad (2)$$

Similarly, the overhead incurred at the MAC layer of the MS side is:

$$OH_{MS} = PHY + SIFS + ACK \text{ (Second)} \quad (3)$$

where PHY is the physical layer header and is sent at 1 Mbps. Throughout our analysis, we assume that MS uses a scheduled delivery mechanism for VoIP traffic since this can guarantee a minimum access delay for voice packets because MSs can access the shared channel at pre-scheduled time intervals without need for contention (this is the reason that DIFS and $CW_{min}$ time are omitted from equations 2 and 3 above.)

In this analysis, the possibility of packet loss and ACK loss and the need for voice packets retransmission is ignored. This means that the VoIP capacity derived is an upper bound on the actual capacity.

$$T_{DL} + T_{UL} = [2^*(\text{Audio Payload} + OH_{hdr})/\text{Transmission-Rate}] + OH_{AP} + OH_{MS} \quad (4)$$

where $$\text{Audio Payload} = P\text{time}^* \text{CodecRate} \quad (5)$$

Here, it is assumed that both UL voice packets sent by the MS and DL voice packets received from the AP have the same size and are sent at the same rate. Next, it is assumed that for the $i^{th}$ AP, $AP_i$, there are $n_i$ active VoIP sessions. These VoIP sessions are terminating at MSs that are associated with $AP_i$. Hence, the normalized loading (i.e. utilization) of $AP_i$ due to the $n_i$ active VoIP sessions can be expressed as follows:

$$U_i = \sum_{j=1}^{n_i} (T_{DL_j} + T_{UL_j}) \times N_{pj} \tag{6}$$

where $N_{pj}$ is the number of voice packets pairs sent by both the AP and MS (per second) for the $j^{th}$ VoIP session and is dependent on the packetization interval of the codec used at the leg between the MS and APi for that call ($Ptime_j$) such that:

$$N_{pj}=1/Ptime_j; \tag{7}$$

In general, for $AP_i$ that has $n_i$ admitted CBR VoIP calls, the maximum number of VoIP sessions that can be supported '$N_i$' is inversely proportional to the actual capacity fraction needed to support ongoing $n_i$ sessions:

$$N_i \propto 1/U_i \tag{8}$$

To maximize the number of VoIP sessions that can be admitted by all the APs in the network, the optimization problem may be written as:

$$\max \sum_{i=1}^{M} N_i \tag{30}$$

where M is the number of APs in the WLAN enterprise.

Because this is a convex problem, it can be rewritten as a minimization of the sum of the loading of all the APs in the enterprise (MaxNetworkCap formulation):

$$\min \sum_{i=1}^{M} U_i \tag{12}$$

$$\text{where } U_i = \sum_{j=1}^{n_i} \frac{T_{DL_j} + T_{UL_j}}{Ptime_{j,1}}$$

subject to:

$$MinPtime_{j,1} \leq Ptime_{j,1} \leq MaxPtime_{j,1}$$

$$Ptime_{j,1}+Ptime_{j,2}+AD(Ptime_{j,1},Ptime_{j,2})+ \\ D_{network} \leq LM_j \tag{13}$$

where $AD(Ptime_{j,1}, Ptime_{j,2}) =$ (14)

$$\left( \left\lceil \frac{\max(Ptime_{j,1}, Ptime_{j,2})}{\min(Ptime_{j,1}, Ptime_{j,2})} \right\rceil - 1 \right) \times \min(Ptime_{j,1}, Ptime_{j,2})$$

where $Ptime_{j,1}$ and $Ptime_{j,2}$ are the pair of packetization interval values corresponding to voice packets generated at the two end MSs of the $j^{th}$ call, $MinPtime_{j,1}$ and $MaxPtime_{j,1}$ are the lower- and upper-bounds of the packetization interval values supported by the mobile station associated with the $i^{th}$ AP and used for the $j^{th}$ call. $LM_j$ is the available round-trip latency margin for the $j^{th}$ VoIP session. AD( ) is the VoIP packets adaptation delay incurred at AVP-RTG server for splitting/packing voice packets received at both legs of the $j^{th}$ VoIP session as a result of using asymmetric $Ptime_{j,1}$ and $Ptime_{j,2}$ values. $D_{network}$ is the network delay which includes all delay components, experienced by VoIP packets, other than those mentioned in the latency margin constraint 13 (e.g. propagation delay, channel access delay, . . . etc). The propagation delay in a typical WLAN enterprise setup is negligible compared with typical packetization interval periods since a wired distribution system (e.g., Ethernet) is used to transport traffic (including VoIP streams) between different AP's in the enterprise.

In a special case of this optimization problem, one may consider the situation where all calls are between mobile stations that support the same vocoder and the same sampling rate. Moreover, it can be assumed that the underlying PHY layer of the IEEE 802.11 WLAN is the same for all APs in the network. In this case, the global optimum may be obtained by splitting the available latency margin "LM" on both sides of the call (i.e. $Ptime_1=Ptime_2=LM/2$). The algorithm "SplitLM" (listed below) may be used as a simple heuristic algorithm to solve the special case problem optimally. However, it provides a suboptimal solution for the more general MaxNetworkCap optimization problem.

| SplitLM: |
| --- |
| Begin<br>1: $Ptime_1$ = min(min(Max_Ptime$_1$, Max_Ptime$_2$), LM/2);<br>2: $Ptime_2$ = $Ptime_1$;<br>End |

Maximizing VoIP Capacity at APs Experiencing Particularly Heavy Traffic:

Alternatively, it is possible to maximize the VoIP capacity of the AP that has the maximum VoIP traffic load among all the "M" APs in the enterprise. An example of such an analysis follows (Min-Max AP Utilization 'MMAU' formulation):

$$\min\{\max U_i\}, i=1, 2, \ldots, M$$

subject to:

$$MinPtime_{j,1} \leq Ptime_{j,1} \leq MaxPtime_{j,1} \tag{15}$$

$$MinPtime_{j,2} \leq Ptime_{j,2} \leq MaxPtime_{j,2} \tag{16}$$

$$Ptime_{j,1}+Ptime_{j,2}+AD(Ptime_{j,1},Ptime_{j,2})+ \\ D_{network} \leq LM_j \tag{17}$$

The min-max optimization above is global, i.e. is applied over all active calls in the WLAN enterprise at the same time.

The non-linear "ceiling $\lceil\ \rceil$" operator in AD( ) is adding a lot to the complexity of both combinatorial discrete integer problems MaxNetworkCap and Min-Max AP Utilization. Although the objective function in both problem formulations can be easily transformed into an equivalent convex optimization problem, unfortunately, it is very difficult to solve both problems optimally because of the non-linearity in the latency margin constraint.

A possible solution for this problem is the use of greedy-based heuristic algorithms. Two such algorithms, "Heuristic MaxNetworkCap" or Heuristic-1 and "Heuristic Min-Max AP Utilization" or Heuristic-2 may be used for near-optimal solution of both maximizing network capacity and maximizing VoIP capacity at APs experiencing particularly hevy traffic.

Both heuristic algorithms deploy a local optimization technique rather than globally minimizing the cost function. The greedy-based solvers work in a way similar to a typical Call Admission Control scheme that initializes the packetization interval values for each new requested call with a feasible solution and then tries a limited number of neighbor "Ptime" values in order to obtain a near-optimal minimum utilization for end-APs.

The "Heuristic Min-Max AP Utilization" algorithm employs a local optimization technique that searches for a suboptimal pair of $Ptime_1$ and $Ptime_2$ values of every newly requested VoIP call rather than trying to globally minimize the cost function. The solver works in a way similar to a typical call admission control scheme. For each newly requested call, the algorithm starts by determining the APs that the two voice MSs are associated with (i.e. $AP_1$ and $AP_2$). Then it initializes the packetization interval length of each MS involved in the new call (i.e. $Ptime_1$ and $Ptime_2$) with a feasible solution which is selected as the minimum of the maximum permissible packetization interval supported by the MS and half of the measured available round-trip latency margin between the two end MSs of the new connection. These initial values are the initial optimal (suboptimal in the context of heuristic algorithms) values for $Ptime_1$ and $Ptime_2$, and are updated during the progress of the algorithm as better feasible solutions are found.

After the initialization phase, the algorithm proceeds (lines 9, 10, and 11) by checking if initialization values for $Ptime_1$ and $Ptime_2$ are the same. If so, a near-optimal solution is found and the algorithm terminates since the use of the symmetric initial values of $Ptime_1$ and $Ptime_2$ satisfies the latency constraint in 17. If initial Ptime values are different, the algorithm (in line 12) checks if $AP_1$ is more heavily loaded than $AP_2$. If this is the case, the algorithm searches for the largest possible value of $Ptime_1$ that would guarantee the admission of the new call while achieving the minimal loading of $AP_1$ (lines 13 through 20). This is done by starting with $Ptime_1$=Initial $Ptime_1$ and iteratively decrementing $Ptime_1$ until it reaches Initial $Ptime_2$. In each iteration of the for loop (line 13), the algorithm tries to find the largest possible value of $Ptime_2$ that (given the current value of $Ptime_1$ of the loop iteration) satisfies the latency constraint and would produce a better solution (i.e., lower utilization of $AP_1$ and $AP_2$.) If none is found, $Ptime_1$ is decremented by the minimum frame size (e.g. 20 ms) and the same steps are repeated until either a better solution is found or $Ptime_1$ reaches the value of Initial $Ptime_2$. On the other hand, if $AP_2$ is more heavily loaded than $AP_1$, the algorithm searches for the largest possible value of $Ptime_2$ that would guarantee the admission of the new call while achieving the minimal utilization of $AP_2$ (lines 21 through 30).

Min-Max AP Utilization (MMAU):

```
Init
/*Initialize Ptimes for both MSs with the maximum possible values based on available
latency margin LM and vocoders constraints.
1: AP₁ = ID of AP that MS₁ is associated with.
2: AP₂ = ID of AP that MS₂ is associated with.
3: Initial_Ptime₁ = min(LM/2, MaxPtime₁);
4: Initial_Ptime₂ = min(LM/2, MaxPtime₂);
5: Optimal_Ptime₁ = Initial_Ptime₁;
6: Optimal_Ptime₂ = Initial_Ptime₂;
7: Best solution found so far = infinity;
8: Begin
9:  if (Initial_Ptime₁ = = Initial_Ptime₂) {
10:    Update Utilizations of end APs;
11:    Exit; // Near optimal Ptimes are found.
12: } else if ( Utilizations(AP₁) ≧ Utilizations(AP₂) ) {
13:    for (Ptime₁ = Initial_Ptime₁; Ptime₁ > Initial_Ptime₂; Ptime₁ - -)
14:       {
15:          Ptime₂ = Initial_Ptime₂;
16:          while (Ptime₁ & Ptime₂ do not satisfy LM constraint)
17:             Ptime₂ = Ptime₂ - MinPtime₂;
18:          if (Max(Utilizations(AP₁,AP₂)) < Best solution found so far)
19:             Update best solution of Ptimes and best AP utilizations found so far;
20:       }
21:} else if ( Utilizations(AP₂) > Utilizations(AP₁) ) {
22:    for (Ptime₂ = Initial_Ptime₂; Ptime₂ > Initial_Ptime₁; Ptime₂ - -)
23:       {
24:          Ptime₁ = Initial_Ptime₁;
25:          while (Ptime₁ & Ptime₂ do not satisfy LM constraint)
26:             Ptime₁ = Ptime₁ - MinPtime₁;
27:          if ( Max(Utilizations(AP₁,AP₂)) < Best solution found so far)
28:             Update best solution of Ptimes and best AP utilizations found so far;
29:       }
30:}
31:End
```

The "Heuristic MaxNetworkCap" algorithm is a variant version of the "Heuristic Min-Max AP Utilization" algorithm. The "Heuristic MaxNetworkCap" algorithm deploys a local optimization technique that searches for a suboptimal pair of $Ptime_1$ and $Ptime_2$ of a newly requested VoIP call to minimize the sum of the one norm of the loading of all APs. The algorithm initialization part is identical to the one in the "Heuristic Min-Max AP Utilization" algorithm. After the initialization phase, the algorithm proceeds (lines 9, 10, and 11 in FIG. 3) by checking if initialization values for $Ptime_1$ and $Ptime_2$ are the same. If so, a near-optimal solution is found and the algorithm terminates since the use of the symmetric initial values of $Ptime_1$ and $Ptime_2$ satisfies the latency constraint in 13. If initial Ptime values are different, the algorithm (line 12) checks if Initial $Ptime_1$ is less than Initial $Ptime_2$. If this is the case, the algorithm searches for the largest possible values of $Ptime_1$ and $Ptime_2$ that would guarantee the admission of the new call while achieving the minimal sum of $AP_1$ and $AP_2$ utilizations (lines 13 through 20). This is done by fixing $Ptime_1$=Initial $Ptime_1$ and setting $Ptime_2$=Initial $Ptime_2$. Then, the algorithm iteratively decrements $Ptime_2$ until it reaches Initial $Ptime_1$. In each iteration of the for loop (line 14), the algorithm searches for the largest possible value of $Ptime_2$ that (given the value of $Ptime_1$) satisfies the latency constraint and would produce a better solution (i.e., lower sum of $AP_1$ and $AP_2$ utilizations.)

On the other hand, if Initial $Ptime_2$ is less than Initial $Ptime_1$, the algorithm fixes $Ptime_2$ to Initial $Ptime_2$ and sets $Ptime_1$=Initial $Ptime_1$ and iteratively searches for the largest possible value of $Ptime_1$ that would guarantee the admission of the new call while achieving the minimal sum of $AP_1$ and $AP_2$ utilizations (lines 21 through 30.)

MaxNetworkCap:

```
Init
/*Initialize Ptimes for both MSs with the maximum possible values based on available
latency margin LM and vocoders constraints.
1: AP1 = ID of AP that MS1 is associated with.
2: AP2 = ID of AP that MS2 is associated with.
3: Initial_Ptime1 = min(LM/2, MaxPtime1);
4: Initial_Ptime2 = min(LM/2, MaxPtime2);
5: Optimal_Ptime1 = Initial_Ptime1;
6: Optimal_Ptime2 = Initial_Ptime2;
7: Best solution found so far = infinity;
8: Begin
9: if (Initial_Ptime1 = = Initial_Ptime2) {
10:    Update Utilizations of end APs;
11:    Exit; // Near optimal Ptimes are found.
12: } else if (Initial_Ptime1 < Initial_Ptime2) {
13:      Ptime1 = Initial_Ptime1;
14:      for (Ptime2 = Initial_Ptime2; Ptime2 > Initial_Ptime1; Ptime2 - -)
15:        {
16:           if (Ptime1 & Ptime2 satisfy LM constraint)
17:              if (Sum_of_Utilization(AP1, AP2) < Best solution found so far)
18:                 Update optimal solution of Ptimes and optimal (i.e. minimum) AP utilizations
19:                 found so far;
20:        }
21: } else if (Initial_Ptime1 > Initial_Ptime2) {
22:      Ptime2 = Initial_Ptime2;
23:      for (Ptime1 = Initial_Ptime1; Ptime1 > Initial_Ptime2; Ptime1 - -)
24:        {
25:           if (Ptime1 & Ptime2 satisfy LM constraint)
26:              if (Sum_of_Utilization(AP1, AP2) < Best solution found so far)
27:                 Update optimal solution of Ptimes and optimal (i.e. minimum) AP utilizations
28:                 found so far;
29:        }
30: }
31:End
```

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for communicating a Voice over Internet Protocol (VoIP) call in a network, the method comprising:
    having a network server in the network establish the VoIP call between a first terminal and a second terminal in two or more call legs;
    calculating a first individualized packetization interval for a first leg of the VoIP call based on network latency characteristics of the VoIP call and based on considerations related to overall performance of the network;
    communicating packets of the call on the first leg at the first individualized packetization interval;
    calculating a second individualized packetization interval for a second leg of the VoIP call based on network latency characteristics of the VoIP call, wherein the second individualized packetization interval differs from the first individualized packetization interval; and
    communicating packets of the call on the second leg at the second individualized packetization interval,
    wherein the considerations comprise reducing the loading at one or more Access Points in the network.

2. The method of claim 1, further comprising:
measuring the network latency characteristics.

3. The method of claim 2, wherein measuring the network latency characteristics comprises receiving at a network server from the first terminal of the VoIP call measured latency information relating to the leg between the first terminal and the network server.

4. The method of claim 1, further comprising:
estimating the network latency characteristics.

5. The method of claim 4, wherein estimating the network latency characteristics comprises estimating the network latency characteristics based on knowledge of the relative locations of the first terminal and the second terminal and characteristics of the network.

6. The method of claim 1, wherein the considerations comprise maximizing the total number of VoIP calls that can be supported by the network at that time.

7. A method in a wireless mobile communication device for communicating in a network using a Voice over Internet Protocol (VoIP) call, the method comprising:
- establishing with a network server a VoIP connection with data having a predetermined data packet size;
- evaluating a round-trip latency of the VoIP connection;
- transmitting to the network server the evaluated round-trip latency of the VoIP connection; and
- receiving from the network server a data packet, wherein a size of the data packet is based upon the evaluated round-trip latency of the VoIP connection,
- wherein the size of the received data packet is further based on considerations related to overall performance of the network, and
- wherein the considerations include reducing the loading at one or more Access Points in the network.

8. The method of claim 7, wherein evaluating the round-trip latency of the VoIP connection includes:
- estimating the round-trip latency of the VoIP connection.

9. The method of claim 7, wherein evaluating the round-trip latency of the VoIP connection includes:
- measuring the round-trip latency of the VoIP connection.

10. The method of claim 7, wherein the considerations include maximizing the total number of VoIP connections that can be supported by the network at that time.

11. A network server comprising:
- a processor;
- a network interface card coupled to the processor to enable the network server to connect to a network; and
- a memory coupled to the processor, the memory storing code that, when executed by the processor, causes the network server to establish a first leg of a Voice over Internet Protocol (VoIP) call with a first participant of the call and to establish a second leg of the call with a second participant of the call, the memory also storing code that, when executed by the processor, causes the network server to create and maintain queues for translating incoming data from one participant of the call from one packetization interval into a different packetization interval for the other participant of the call,
- the memory also storing code that, when executed by the processor, causes the network server to determine the packetization interval for the first leg based on network latency characteristics for the first leg and based on considerations related to overall performance of the network and to determine the packetization interval for the second leg based on network latency characteristics for the second leg,
- wherein the considerations comprise reducing the loading at one or more Access Points in the network.

12. The network server of claim 11, wherein the network server is a real-time gateway.

* * * * *